UNITED STATES PATENT OFFICE.

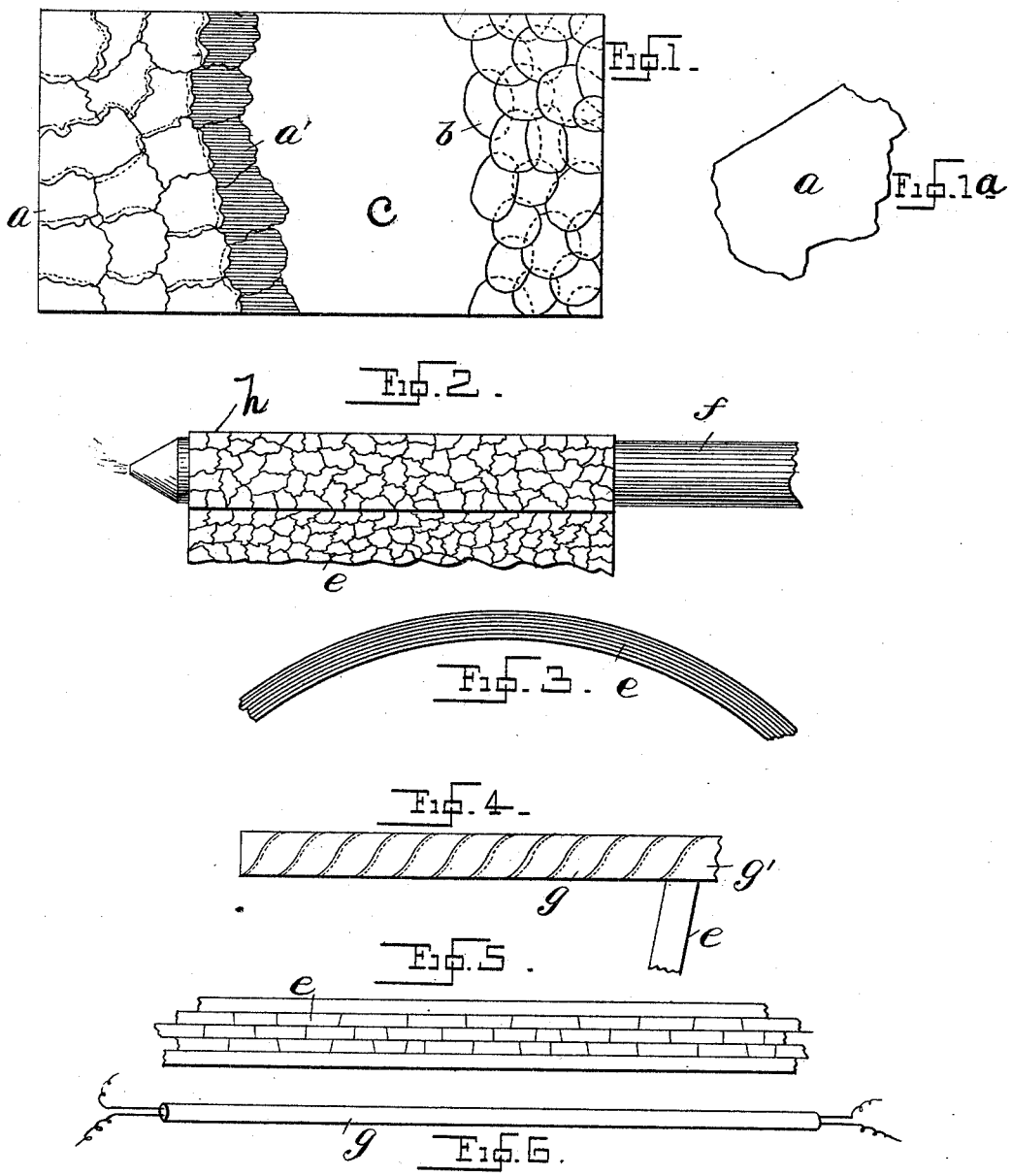

CHARLES W. JEFFERSON, OF SCHENECTADY, NEW YORK, ASSIGNOR TO EUGENE MUNSELL & CO., OF NEW YORK, N. Y., AND ELIZABETH, NEW JERSEY.

ELECTRICAL INSULATING CONDUIT.

SPECIFICATION forming part of Letters Patent No. 491,707, dated February 14, 1893.

Application filed May 21, 1892. Serial No. 433,820. (No model.)

*To all whom it may concern:*

Be it known that I, CHARLES W. JEFFERSON, a subject of the Queen of Great Britain, and a resident of Schenectady, in the county of Schenectady and State of New York, have invented certain new and useful Improvements in Electrical Insulating Conduits, (Case No. 1,) of which the following is a specification.

My invention relates to a tube or cylinder made of mica scales as distinguished from comminuted mica. The tube can be made of any size or length.

The object of the invention is to provide a tube to be used for the purpose of electrically insulating, and mechanically protecting any substance or liquid employed as an electrical conductor.

Sheet mica consitutes the bulk of the material. The natural mica in all cases is split up into laminæ $a$ or $b$ extremely thin; say from one to two mills, which I call elementary mica scales. These are pasted with a suitable liquid gum upon a piece of sheet iron $c$, previously dusted with soap-stone; so as to form continuous sheets or strips of any size or thickness, and with the edges of the individual pieces $a$ or $b$ of mica overlapping, so as to give the sheet some strength.

The invention is made definite and clear by reference to the accompanying drawings.

Figure 1 is a plan of the apparatus used in the first part of the process, and some of the mica scales are shown. Fig. 1$^a$ is a plan of an isolated scale showing the typical shape thereof when untrimmed. Fig. 2 is an elevation of a steam heated mandrel with some of the prepared material in the process of winding to form a cylinder of mica. Fig. 3 is an enlarged cross section of the tube after being formed. Fig. 4 exhibits the process of forming long tubes of mica. Fig. 5 is an enlarged section of a sheet which is reinforced by a cloth extending over the area of many smaller scales. Fig. 6 shows an application of the invention, being a tube holding electrical conductors.

For a short tube, or cylinder $h$ this mica sheet, of the same width as the required length of tube is rolled up on a rod or until the required thickness of mica is obtained. If each layer of mica sheets is pasted as wound on, and the paste allowed to set before the mica tube is slipped off the rod, a very small solid tube $h$ composed almost entirely of mica is obtained, so solid that it can be turned in a lathe in the same manner as wood, iron &c.

The object of the soapstone is to facilitate the removal of the built up sheet from the iron surface.

To obtain a longer tube, mica strips $e$ as before mentioned are wound spirally, (with their edges overlapping) around a tube or rod, several layers being so wound on the top of each other with their joints overlapping at different parts of the tube, until the required size is obtained.

To facilitate the bending of the built up mica sheets $e$ or strips $e$ round the rod upon which the tube is formed, a gum that will soften with heat is used to fasten the small sheets of mica together, such as "White French Varnish."

When using mica sheets or strips that are in a very flexible or almost wet or green condition, a pipe $f$ that has steam and cold water connections is used upon which the mica tube is formed. The method is as follows: Form the mica tube when the pipe is cold. When formed, and secured, turn on the steam and cook the tube until the paste has become dry. Then turn off the steam, and turn on the cold water which will set the gum. When the tube $h$, is hard, take it off the pipe and prepare to make another.

In building up the mica either in sheet or strip, it adds to the ease in handling the mica sheet or strip when in a plastic condition, to paste upon one side (or both sides for that matter) a sheet of some tissue paper that has a long fiber, or some thin textile fabric. A sheet that has just been made is baked upon a heated plate until it has obtained some degree of toughness, caused by the solvent of the gum evaporating.

To cut large sheets into strips, the sheet has to be fairly dry, and to form tubes with dry strips, they must be softened with heat before they are wound upon the rod, and the rod must also be a pipe with steam connections.

I claim as my invention:—

1. An electrical insulating conduit, consisting of the combination of convolutions of elementary mica scales with their edges overlapping; and varnish or similar insulating cement between the mica layers and between the scales.

2. An electrical insulating conduit, consisting of the combination of convolutions of cloth covered mica scales and an insulating cement holding the same together in a mass.

3. An electrical insulating conduit consisting of strips of series of joined mica scales wound helically upon one another in layers and having their edges overlapping one another.

4. An electrical insulating conduit consisting of the combination of layers of helically wound strips of mica, and cement holding the same together.

In testimony that I claim the foregoing as my invention I have signed my name, in presence of two witnesses, this 18th day of May, 1892.

CHARLES W. JEFFERSON.

Witnesses:
S. W. JACKSON,
A. H. JACKSON.